(12) United States Patent
Cheng et al.

(10) Patent No.: US 7,446,498 B2
(45) Date of Patent: Nov. 4, 2008

(54) SMART PHASE LOCK LOOP

(75) Inventors: Louis Cheng, Richmond Hill (CA); Ming Ma, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 11/525,172

(22) Filed: Sep. 22, 2006

(65) Prior Publication Data

US 2008/0074071 A1    Mar. 27, 2008

(51) Int. Cl.
    *G05B 11/36* (2006.01)
(52) U.S. Cl. ............ 318/609; 318/400.38; 388/906; 388/911
(58) Field of Classification Search ......... 318/138, 318/254, 439, 606–610, 720–724, 700, 400.04, 318/400.12, 400.14, 400.38; 388/906, 911
See application file for complete search history.

(56) References Cited

U.S. PATENT DOCUMENTS

| | | | |
|---|---|---|---|
| 4,260,937 A | 4/1981 | Cavil et al. | |
| 4,536,685 A | 8/1985 | Fattal et al. | |
| 4,659,969 A * | 4/1987 | Stupak, Jr. | 318/128 |
| 5,155,419 A * | 10/1992 | Naito | 318/254 |
| 5,428,283 A | 6/1995 | Kalman et al. | |
| 5,532,583 A * | 7/1996 | Davis et al. | 324/202 |
| 6,144,125 A | 11/2000 | Birkestrand et al. | |
| 6,697,270 B1 | 2/2004 | Kalman et al. | |
| 6,744,230 B2 * | 6/2004 | Hill et al. | 318/254 |
| 6,756,702 B1 | 6/2004 | Kalman et al. | |
| 6,965,227 B2 * | 11/2005 | Blossfeld | 324/166 |
| 6,975,082 B2 | 12/2005 | Crain et al. | |
| 6,986,688 B1 | 1/2006 | Jansen | |
| 7,026,772 B2 | 4/2006 | Quirion | |
| 7,079,598 B2 | 7/2006 | Birkett et al. | |

* cited by examiner

*Primary Examiner*—Bentsu Ro
(74) *Attorney, Agent, or Firm*—Oral Caglar, Esq.

(57) ABSTRACT

A method and apparatus perform control. A control method according to one embodiment accesses a Hall effect signal; obtains an error signal relating to a system parameter using the Hall effect signal and a reference signal for the system parameter; obtains a calculated signal for the system parameter using the error signal; and utilizes the calculated signal as a new reference signal for the system parameter, for a next iteration of the obtaining steps.

7 Claims, 6 Drawing Sheets

100

SMART PHASE LOCK LOOP

BACKGROUND OF THE INVENTION

1. Field of the Invention

The present invention relates to control systems, and more particularly to a method and apparatus for synchronizing a motor's position and speed in a motor drive system.

2. Description of the Related Art

Many electrical and mechanical systems and environments include motor drive systems, which are energy conversion systems that produce mechanical/kinetic energy from electrical energy. The energy produced by motor drive systems is then used by various equipment units.

A typical motor drive system comprises a stator, a rotor, and a power inverter. The power inverter generates electromagnetic fields at the stator, which in turn cause the rotor to rotate. The position of the rotor during its movement is an important parameter used for control and monitoring of a motor drive system.

Hall effect sensors are typically placed inside a motor drive system and used to identify the rotor position in motor controls. Such Hall effect sensors are normally placed at 120 degrees apart for a three-phase motor, and are aligned with the back electromotive force (Emf) of the stator winding. Field Programmable Gate Arrays (FPGA) are typically used to count the duration of the rising edges between Hall effect signals, to compute the speed and angle of the rotor. This method of determining rotor motion parameters, however, is sensitive to noise, and hence is degraded by noise. When noises contaminate the rising edge of the Hall effect signals, the synchronization of the Hall effect signals to the back Emf of the motor drive system is lost, leading to the degradation of the motor drive performance. Motor controls failure can then occur.

Disclosed embodiments of this application address these and other issues by implementing a closed loop control that generates and locks motor reference signals to the fundamental component of the Hall effect signal generated by Hall effect devices. Even if a Hall effect signal is corrupted due to noise, the closed loop controls described in this application can automatically correct errors and maintain synchronization between Hall effect signals and motor reference signals. Disclosed embodiments of this application hence improve noise immunity of motor drive systems, by tracking to the fundamental components of the Hall effect signals. Even if the Hall effect signals are partially lost or corrupted, disclosed embodiments of this application continue to track and synchronize the motor drive reference signals with the fundamental frequency of the Hall effect signals.

SUMMARY OF THE INVENTION

The present invention is directed to a method and apparatus for control. According to a first aspect of the present invention, a control method comprises: accessing a Hall effect signal; obtaining an error signal relating to a system parameter using the Hall effect signal and a reference signal for the system parameter; obtaining a calculated signal for the system parameter using the error signal; and utilizing the calculated signal as a new reference signal for the system parameter, for a next iteration of the obtaining steps.

According to a second aspect of the present invention, a control apparatus comprises: a signal input unit for accessing a Hall effect signal; and a feedback system for controlling a system parameter, the feedback system controlling the system parameter by obtaining an error signal relating to the system parameter using the Hall effect signal and a reference signal for the system parameter, obtaining a calculated signal for the system parameter using the error signal, and utilizing the calculated signal as a new reference signal for the system parameter, for a next iteration of the obtaining steps.

According to a third aspect of the present invention, a control apparatus comprises: a signal input unit for accessing a positional signal; and a feedback system for controlling a system parameter, the feedback system controlling the system parameter by obtaining an error signal relating to the system parameter using the positional signal and a reference signal for the system parameter, obtaining a calculated signal for the system parameter using the error signal, and utilizing the calculated signal as a new reference signal for the system parameter, for a next iteration of the obtaining steps.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
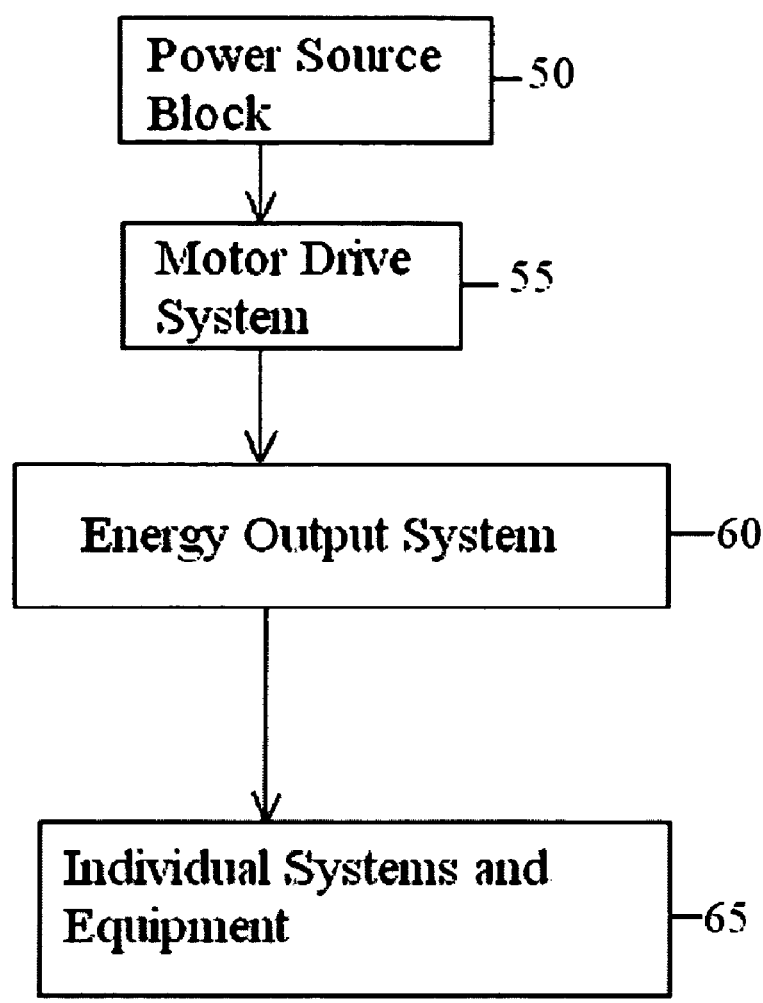
FIG. 1 is a block diagram of an electrical/mechanical system containing a motor drive system with a smart phase lock loop according to an embodiment of the present invention.

Aspects of the invention are more specifically set forth in the accompanying description with reference to the appended figures FIG. 1 is a block diagram of an electrical/mechanical system containing a motor drive system with a smart phase lock loop according to an embodiment of the present invention. The electrical/mechanical system 100 illustrated in FIG. 1 includes the following components: a power source block 50; a motor drive system 55 with a smart phase lock loop system; an energy output system 60; and individual systems and equipment 65. Operation of the electrical/mechanical system 100 in FIG. 1 will become apparent from the following discussion.

Electrical/mechanical system 100 may be associated with systems that include electrical and mechanical components, such as a cabin air compressor system, a heating system, a traction system, etc., in an aircraft, a ship, a train, a laboratory facility, etc. Power source block 50 provides electrical power to motor drive system 55. Power source block 50 handles wattage power that can be on the order of W, kW, MW, or hundreds of kW, or MW, and voltages that can be on the order of Volts to thousands of Volts. The output of power source block 50 may be a DC voltage, a smoothed DC voltage, an AC voltage, etc. Power source block 50 may include transformers, rectifiers, thyristors, filters, circuit breakers, etc. Motor drive system 55 transforms electrical energy received from power source block 50 into mechanical/kinetic energy. Motor drive system 55 may include electrical circuits and components, mechanical components, magnetic components such as coils and permanent magnets, etc. Energy output system 60 outputs the energy generated by motor drive system 55 to individual systems and equipment 65. Energy output system 60 may include shafts, gearboxes, wheels, transmission systems, electrical sensors, electrical circuits, etc. Individual systems and equipment 65 are systems that enable functioning of services onboard a vehicle, in a lab, for a piece of equipment, etc. Individual systems and equipment 65 may include a cabin air compressor, an electric generator, a set of wheels, a traction system, a braking system, etc.

Figure 2A:
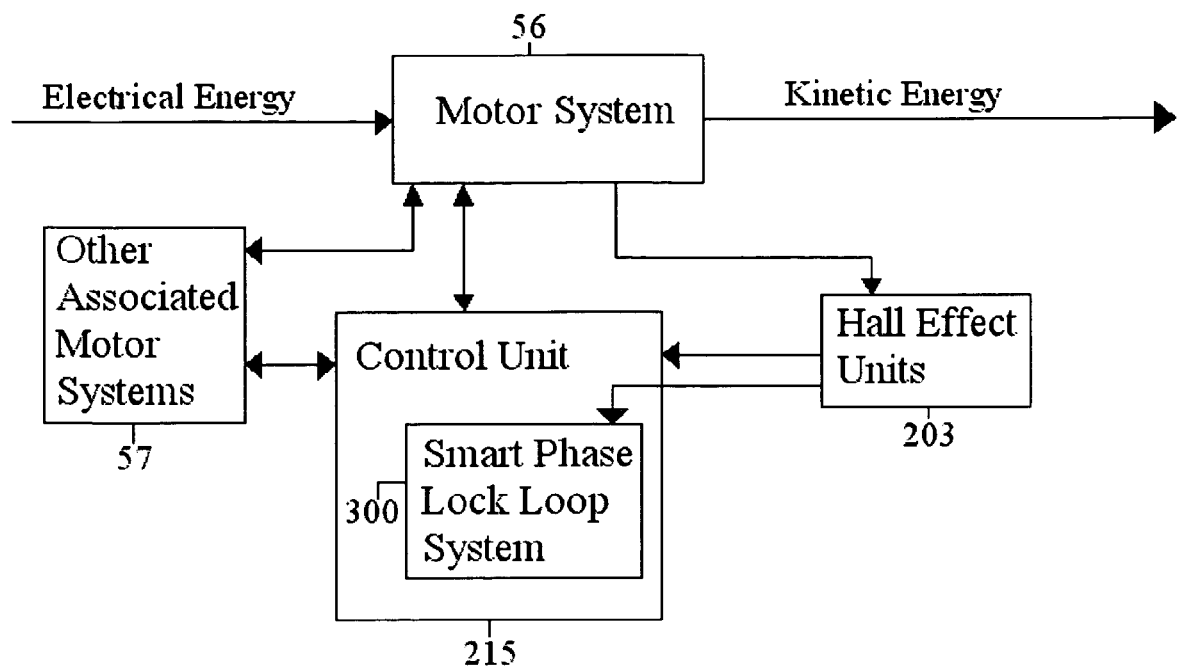
FIG. 2A is a block diagram of a motor drive system with a smart phase lock loop according to an embodiment of the present invention.

FIG. 2A is a block diagram of a motor drive system 55 with a smart phase lock loop system 300 according to an embodiment of the present invention. As shown in FIG. 2A, the motor drive system 55 includes: a motor system 56; Hall effect units 203; a control unit 215 including a smart phase lock loop system 300; and other associated motor systems 57. The motor system 56 includes mechanical, electrical, magnetic, etc. parts that compose a motor, such as a rotor, a stator, magnetic pole units, wires, etc. Control unit 215 communicates with, and controls the operation of motor system 56. Control unit 215 may be implemented as a microprocessor, electronic circuit board, FPGA, ASIC, etc. The Hall effect units 203 use the Hall effect in the presence of magnetic fields inside motor system 56, to measure and output various parameters related to motor movement and performance. The Hall effect units 203 communicate with the smart phase lock loop system 300 inside control unit 215, to identify various variables related to the motor system 56, such as rotor position for motor system 56. The smart phase lock loop system 300 then controls aspects of the operation of motor system 56, using data received from the Hall effect units 203. Other associated motor systems 57 include other mechanical, electrical, etc. components, such as additional sensors, circuits, etc., used during operation of motor system 56.

Figure 2B:
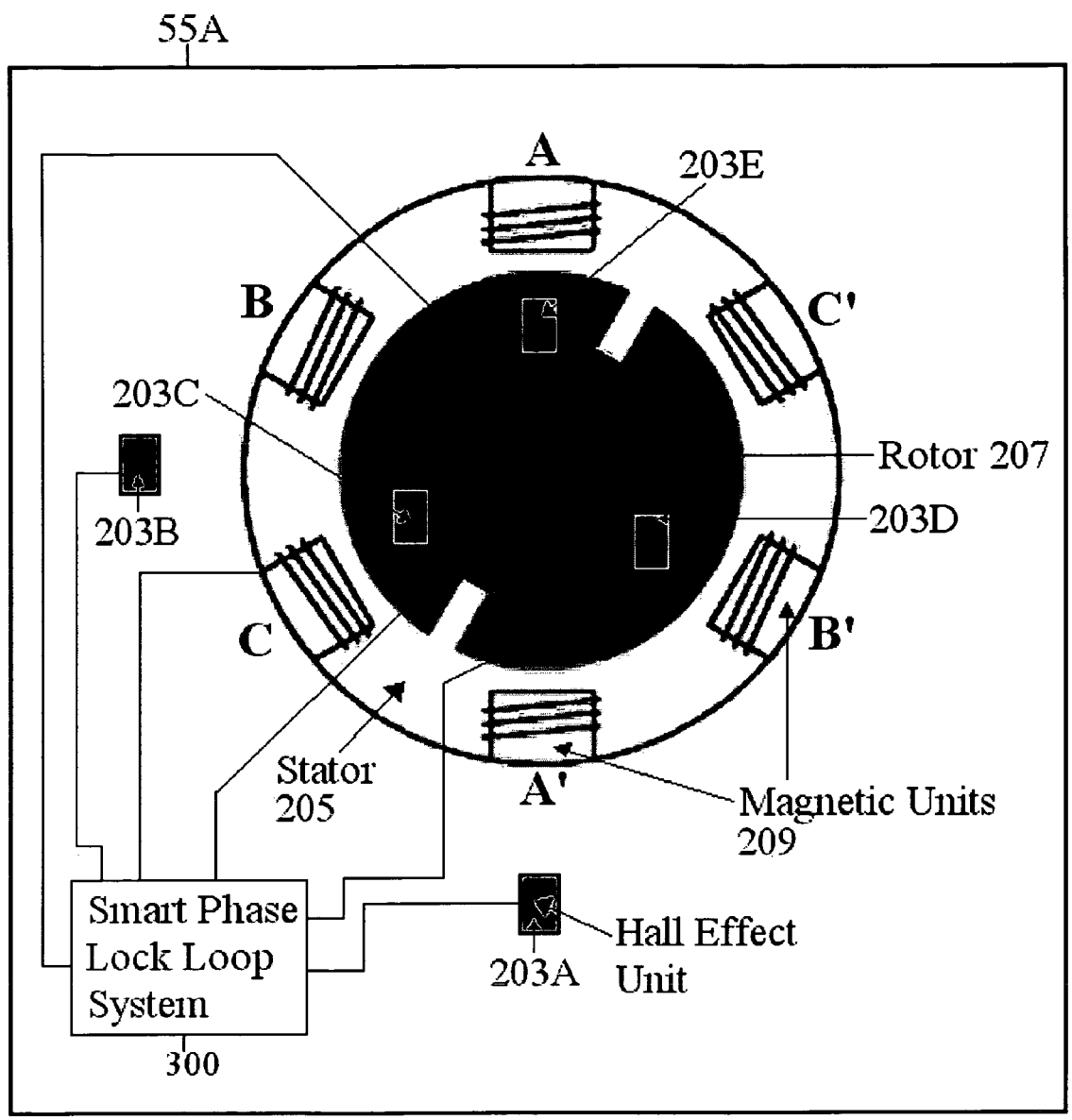
FIG. 2B is an exemplary block diagram of a motor drive system with a smart phase lock loop according to an embodiment of the present invention illustrated in FIG. 2A.

FIG. 2B is an exemplary block diagram of a motor drive system 55A with a smart phase lock loop according to an embodiment of the present invention illustrated in FIG. 2A. The motor drive system 55A includes a stator 205, a rotor 207, magnetic units 209, a smart phase lock loop system 300, and Hall effect units 203A, 203B, 203C, 203D, 203E. The rotor 207 rotates in the magnetic field created by the magnetic units 209, and the Hall effect units 203A, 203B, 203C, 203D, 203E sense magnetic fields of the magnetic units 209, and send signals to the smart phase lock loop system 300. The Hall effect units are Hall effect sensors that vary their output in response to changes in magnetic field/magnetic field density. The Hall effect units may include electronic components such as transducers, transistors, etc. The Hall effect signals are related to magnetic fields and fluxes caused by the magnetic units 209. The Hall effect signals may be voltages, or other quantities related to voltage. Since the rotor position is influenced by the magnetic fields and fluxes caused by the magnetic units 209, and the Hall effect units measure signals related to the magnetic fields and fluxes caused by the magnetic units 209, the Hall effect signals are related to the rotor position.

The motor drive system 55A illustrated in FIG. 2B is used only as an exemplary illustration, and is not limitative of the motor drive systems shapes and types to which the current invention applies. The current invention applies to a large variety of motor drive systems, including, but not limited to, AC synchronous motors, AC induction motors, brushless DC motors, three-phase AC synchronous motors, stepper motors, reluctance motors, three-phase AC induction motors, permanent magnet (PM) motors.

Figure 3:
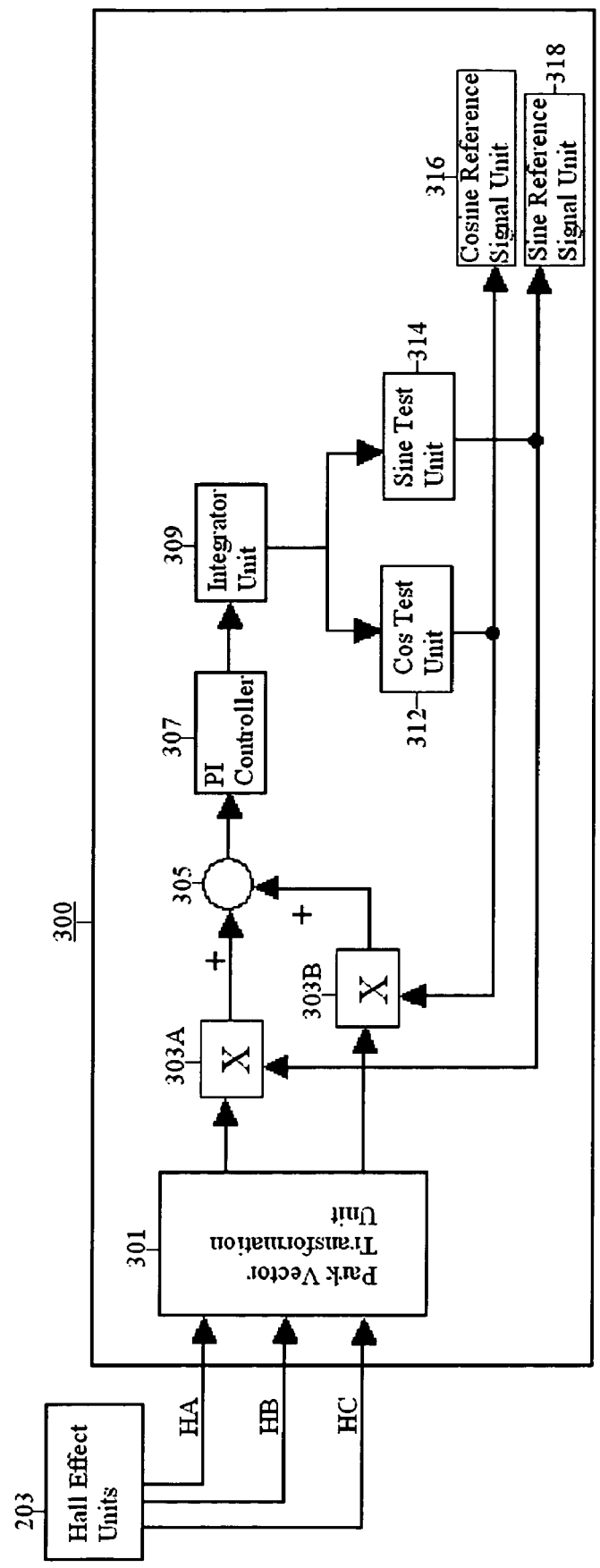
FIG. 3 is a block diagram of a smart phase lock loop system for use with a motor drive system according to an embodiment of the present invention.

FIG. 3 is a block diagram of a smart phase lock loop system 300 for use with a motor drive system 55 according to an embodiment of the present invention. As illustrated in FIG. 3, the smart phase lock loop system 300 includes: a Park vector transformation unit 301; multiplication units 303A and 303B; an error measurement unit 305; a Proportional Integral (PI) controller 307; an integrator unit 309; a Cos test unit 312 and a Sine test unit 314; and a Cosine reference signal unit 316 and a Sine reference signal unit 318. The smart phase lock loop system 300 is included in a control unit of the motor drive system 55. The smart phase lock loop system 300 may be implemented as a micro-controller, electronic board, FPGA, ASIC, etc.

The smart phase lock loop system 300 connects to Hall effect units 203 and receives Hall effect signals. For example, a Hall effect signal with three-phase components HA, HB and HC are illustrated as being received by the smart phase lock loop system 300 in FIG. 3.

Park vector transformation unit 301 transforms the received Hall effect signal into a 2-dimensional vector in the stationary frame of the motor drive system 55. Multiplication units 303A and 303B perform the operation of multiplication between two parameters. The error measurement unit 305 obtains a measurement of an error on a variable. The PI controller 307 compares a measured value of a variable with a reference setpoint value. The difference between the measured value of the variable and the reference setpoint value is used to calculate a new value for the variable, and bring the variable value back to its desired setpoint in a feedback loop. The PI controller 307 can adjust variable outputs based on the history and rate of change of an error signal. Integrator unit 309 performs the operation of integration on a parameter. Cos test unit 312 and Sine test unit 314 perform the operations of cosine and sine extraction, given a parameter. Cosine reference signal unit 316 and Sine reference signal unit 318 provide reference signals for the motor drive system 55. The operation of smart phase lock loop system 300 is further described in the flow diagram of FIG. 4.

Figure 4:
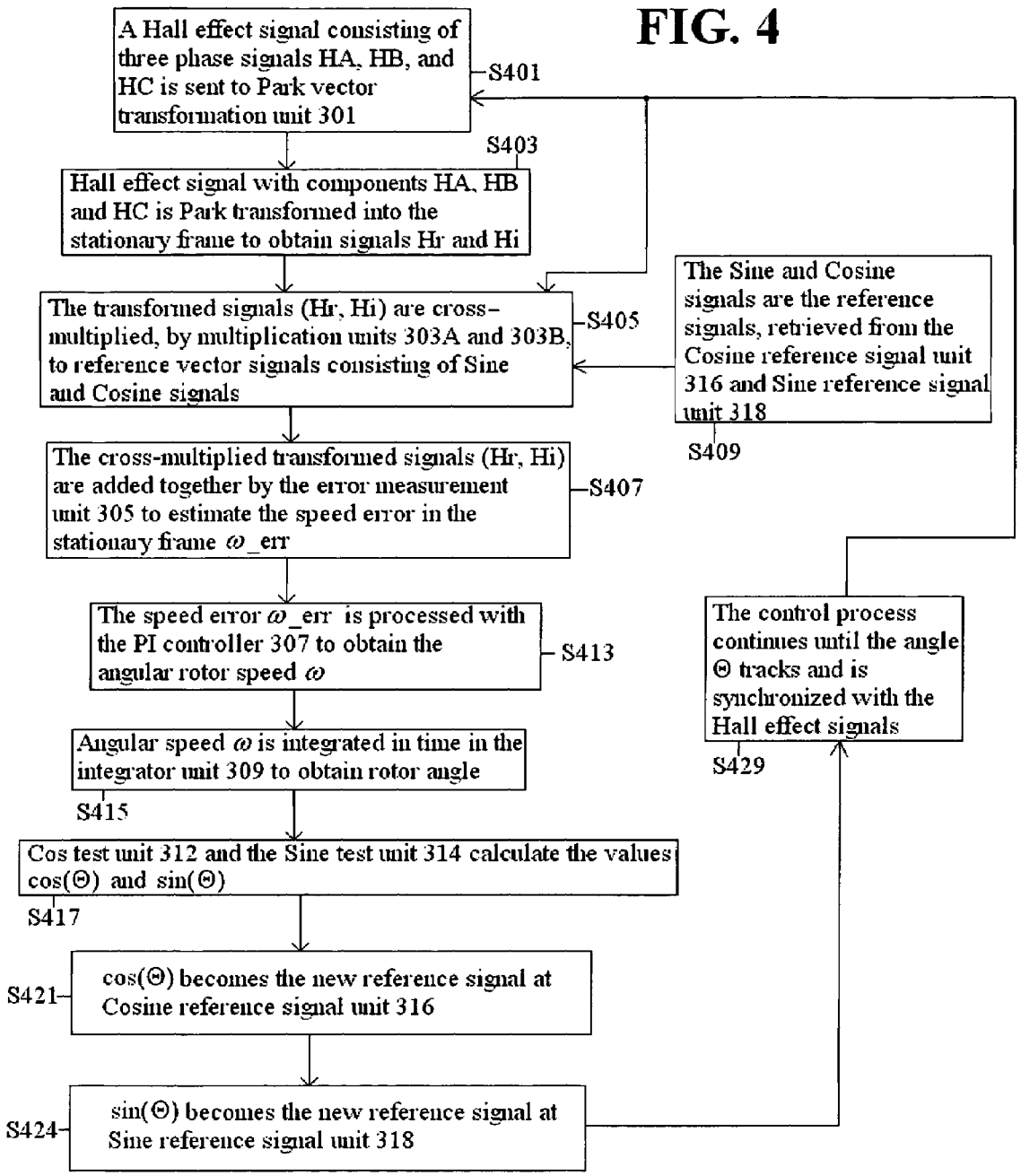
FIG. 4 is a flow diagram illustrating operations performed by a motor drive system with a smart phase lock loop system according to an embodiment of the present invention illustrated in FIG. 3.

FIG. 4 is a flow diagram illustrating operations performed by a motor drive system 55 with a smart phase lock loop system 300 according to an embodiment of the present invention illustrated in FIG. 3.

Feedback controls are used to lock to a Hall effect signal consisting of three phase signals HA, HB, and HC. The Hall effect signal consisting of three phase signals HA, HB, and HC is sent from the Hall effect units 203 to the Park vector transformation unit 301 included in the smart phase lock loop system 300 (S401). The Hall effect signal components HA, HB, and HC may be clean signals (without noise), or may be contaminated by errors and noise. The Hall effect signals HA, HB, and HC are then Park vector transformed into the stationary frame of the motor drive system 55.

The Park vector transformation is a 3-phase to 2-phase transformation. For the Park vector transformation, a moving d axis is chosen in such a way that voltage-current synchronization occurs in phase and frequency. The three-phase variables are expressed with respect to three axes a, b, c, each axis rotated by 120° with respect to the other two axes. The two-phase variables are expressed with respect two fixed axes, a real Re($\alpha$) axis and an imaginary Im($\beta$) axis, and/or two moving axes d and q. Hence, a variable $\overline{X}$ can be expressed in the three-phase system as $$\overline{X} = \frac{2}{3} \cdot (x_a + \vec{m} \cdot x_b + \vec{n} \cdot \vec{x}_c)$$

where $$\vec{m} = -\frac{1}{2} + j\frac{\sqrt{3}}{2} \text{ and } \vec{n} = -\frac{1}{2} - j\frac{\sqrt{3}}{2},$$

in the two-phase system using a real Re($\alpha$) axis and an imaginary Im($\beta$) axis as $\overline{X} = X_r \cdot \vec{1}_\alpha + X_i \cdot \vec{1}_{62}$, and in the two-phase system using two moving axes d and q, as $\overline{X} = X_d + X_q$. The Park transformation from 3-phase to 2-phase is expressed by $$\begin{bmatrix} X_r \\ X_i \end{bmatrix} = \begin{bmatrix} \frac{2}{3} & -\frac{1}{3} & -\frac{1}{3} \\ 0 & \frac{\sqrt{3}}{3} & -\frac{\sqrt{3}}{3} \end{bmatrix} \cdot \begin{bmatrix} x_a \\ x_b \\ x_c \end{bmatrix} = \quad (1)$$

$$\frac{2}{3} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} x_a \\ x_b \\ x_c \end{bmatrix} = \frac{2}{3} \cdot \begin{bmatrix} 1 & -0.5 & -0.5 \\ 0 & 0.866 & -0.866 \end{bmatrix} \cdot \begin{bmatrix} x_a \\ x_b \\ x_c \end{bmatrix}$$

Hence, the Hall effect signal with components HA, HB and HC is Park transformed into the stationary frame by multiplying the Hall effect signal components (HA, HB and HC) with the matrix (S403) as illustrated below:

$$\begin{bmatrix} Hr \\ Hi \end{bmatrix} = \frac{2}{3} \cdot \begin{bmatrix} 1 & -0.5 & -0.5 \\ 0 & 0.866 & -0.866 \end{bmatrix} \cdot \begin{bmatrix} HA \\ HB \\ HC \end{bmatrix} \quad (2)$$

If the units for Hall signal components HA, HB and HC are rad/sec, the units of the transformed signals (Hr, Hi) are also rad/sec. The transformed signals (Hr, Hi) are then crossed multiplied, by multiplication units 303A and 303B, to reference vector signals consisting of Sine and Cosine signals (S405) and added together by the error measurement unit 305 (S407), to estimate the speed error in the stationary frame, as described by the equation below:

$$\omega\_err = Hr * \text{Sine} + Hi * \text{Cosine}. \quad (3),$$

as are looking at the q-axis. If the q-axis component is zero, for example, the reference angle is in phase with the back Emf of the motor. In equation (3), the Sine and Cosine of rotor reference angle $\theta$ are used. The rotor reference angle $\theta$, which is a time variant, may be initialized based on the motor operation. For example, if the motor starts from a resting state, the rotor reference angle $\theta$ is assumed to be zero at the initial start time.

If the Hall effect signal components HA, HB, and HC contain errors and noise, then the transformed signals (Hr, Hi) also include the errors and noise, hence the parameter $\omega\_err = Hr * \text{Sine} + Hi * \text{Cosine}$ is an inexact value, including noise, of the rotor angular speed. The Sine and Cosine signals are the reference signals for the transformation, and are retrieved from the Cosine reference signal unit 316 and Sine reference signal unit 318 (S409).

The speed error $\omega\_err$ is next processed with the PI controller 307, to obtain the angular rotor speed $$\omega = K_p \cdot \omega\_err(t) + K_i \cdot \int_{-\infty}^{t} \omega\_err(t')dt',$$

where $K_p$ and $K_i$ are the proportional gain and the integral gain of the PI controller (S413).

By integrating the angular speed $\omega$ in time in the integrator unit 309, the rotor angle $\Theta = \int \omega \cdot dt$ is obtained (S415). The integrator unit 309 sends the obtained angle $\Theta$ to the Cos test unit 312 and the Sine test unit 314, which calculate the values $\cos(\Theta)$ and $\sin(\Theta)$ (S417). $\cos(\Theta)$ then becomes the new reference signal at Cosine reference signal unit 316 (S421), and $\sin(\Theta)$ becomes the new reference signal at Sine reference signal unit 318 (S424). $\cos(\Theta)$ and $\sin(\Theta)$ are then used in the next iteration. In the next loop iteration, the angle $\Theta$ is used to compute the reference signal to be multiplied again with the Hall signal in equation (3), and obtain a new speed error. The control process continues until the angle $\Theta$ tracks and is synchronized with the Hall effect signals (S429).

Hence, the closed loop control provides feedback to the computation using the Hall effect signals to compute the speed error. The closed loop control generates and locks the reference signals to the fundamental component of the Hall effect signal, so that the reference signals track the fundamental components of the Hall effect signals. In the spectrum of the Hall effect signals, the fundamental frequency and the harmonics and noise frequencies, are spread over a wide spectrum. The fundamental component may itself contain noises. The phase lock loop method and apparatus described in this application log to the fundamental component of the Hall effect signals, and provide a noise free reference signal for the angular rotor position. Even if the Hall signal is corrupted due to noise, the closed loop control automatically corrects the error and removes noise effects.

Figure 5:
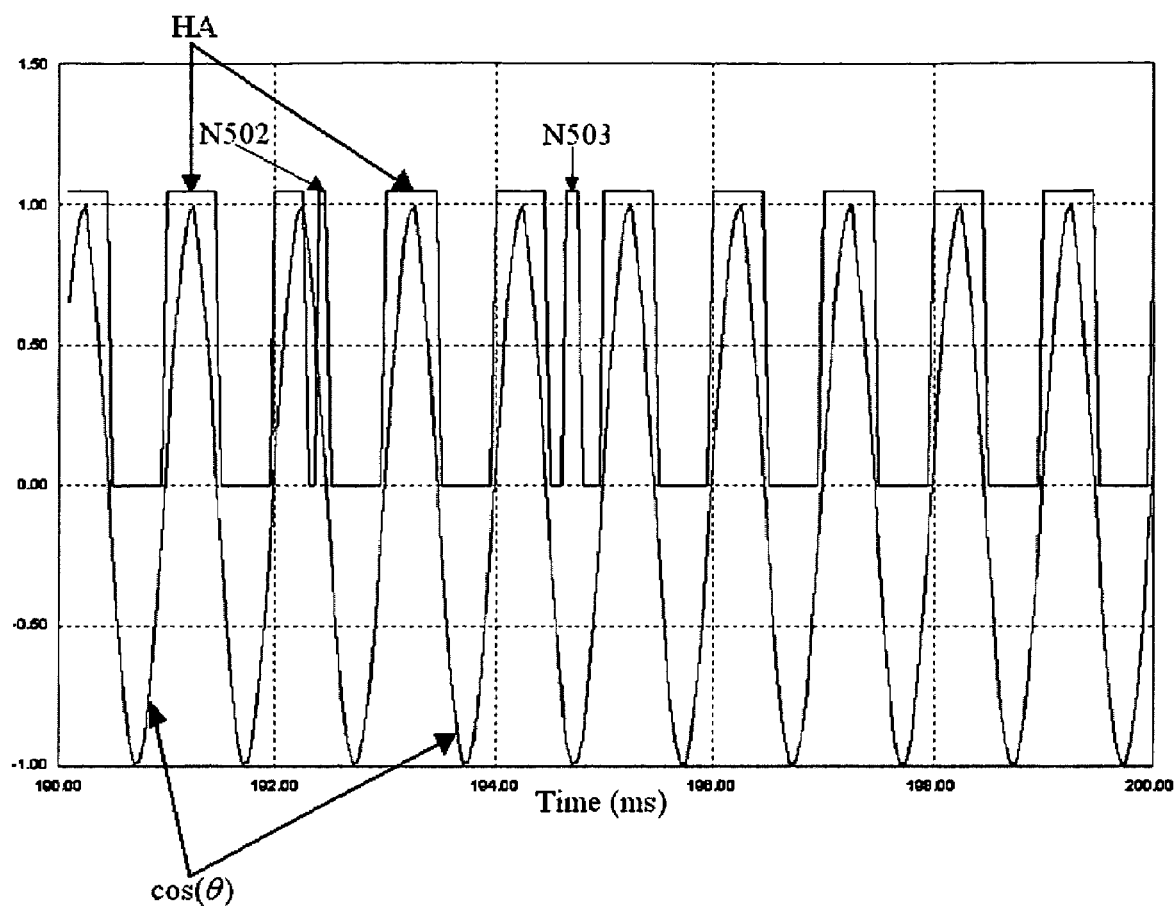
FIG. 5 illustrates an exemplary comparison of a Hall effect signal including noise and a reference signal, according to an embodiment of the present invention illustrated in FIG. 3.

FIG. 5 illustrates an exemplary comparison of a Hall effect signal including noise and a reference signal, according to an embodiment of the present invention illustrated in FIG. 3. FIG. 5 shows a Hall effect signal HA, and a reference signal $\cos(\theta)$. The reference signal $\cos(\theta)$ is obtained from the HA signal as described at FIGS. 3 and 4, and is also aligned with the back Emf phase A of the motor drive system. The Hall effect signal HA includes some noisy parts N502 and N503. However, as seen in FIG. 5, the error or noise in the Hall effect signal does not have much impact on the reference signals generation. Hence, the new phase lock loop (PLL) method tracks with the fundamental of the Hall effect signals, and not with the noise in the Hall effect signals, and correctly obtains the angle of the rotor.

Methods and apparatuses of the present application can be used to also generate and lock reference signals besides rotor angles, to a fundamental of Hall effect signals. Hence, methods and apparatuses of the present application can be used to implement closed loop controls for various system parameters using the Hall effect, where the closed loop controls automatically correct errors in system parameters even when Hall effect signals are corrupted due to errors or noise. Methods and apparatuses of the present application can be used to implement closed loop controls for various system parameters using other signals instead of Hall effect signals, where the closed loop controls automatically correct errors in system parameters even when signals are corrupted due to errors or noise. For example, methods and apparatuses of the present application can be used to implement closed loop controls for various system parameters using synchro signals generated by a synchro rotary electrical transformer associated with a motor drive system; using rotary variable differential transformer (RVDT) signals generated by an RVDT electrical transformer associated with a motor drive system; using resolver signals generated by a resolver associated with a motor drive system; etc. Such a resolver may be a rotary electrical transformer used for measuring degrees of rotation, a brushless transmitter resolver, a two-poles resolver, a rotary antenna system, a digital resolver, etc.

Aspects of the present invention are applicable to a wide variety of motor systems. Aspects of the present invention are also applicable to systems other than motor systems, to perform smart phase lock loop control of system parameters even when sensor signals relating to the systems are corrupted due to errors or noise.

We claim:

1. A control method, said method comprising:
   accessing a Hall effect signal;
   obtaining an error signal relating to a system parameter using said Hall effect signal and a reference signal for said system parameter;
   obtaining a calculated signal for said system parameter using said error signal; and
   utilizing said calculated signal as a new reference signal for said system parameter, for a next iteration of said obtaining steps;
   wherein said step of obtaining the error signal comprises:
      performing a Park transformation of said Hall effect signal into a stationary frame to obtain transformed Hall signals, and
      cross-multiplying said transformed Hall signals with a sine and a cosine of said reference signal for said system parameter to obtain said error signal.

2. A control method, said method comprising:
   accessing a Hall effect signal;
   obtaining an error signal relating to a system parameter using said Hall effect signal and a reference signal for said system parameter;
   obtaining a calculated signal for said system parameter using said error signal; and
   utilizing said calculated signal as a new reference signal for said system parameter, for a next iteration of said obtaining steps; and
   wherein said step of obtaining the calculated signal comprises processing said error signal with a proportional integral controller.

3. The control method as recited in claim 2, wherein said step of obtaining a calculated signal further comprises:
   integrating the output of said proportional integral controller in time to obtain said calculated signal as an angle, wherein said error signal is an angular speed, and said system parameter is an angle parameter.

4. A control apparatus, said apparatus comprising:
   a signal input unit for accessing a Hall effect signal; and
   a feedback system for controlling a system parameter, said feedback system controlling said system parameter by:
      obtaining an error signal relating to said system parameter using said Hall effect signal and a reference signal for said system parameter,
      obtaining a calculated signal for said system parameter using said error signal, and
      utilizing said calculated signal as a new reference signal for said system parameter, for a next iteration of said obtaining steps wherein said feedback system obtains the error signal by:
      performing a Park transformation of said Hall effect signal into a stationary frame to obtain transformed Hall signals, and
      cross-multiplying said transformed Hall signals with a sine and a cosine of said reference signal for said system parameter to obtain said error signal.

5. A control apparatus, said apparatus comprising:
   a signal input unit for accessing a Hall effect signal; and
   a feedback system for controlling a system parameter, said feedback system controlling said system parameter by:
      obtaining an error signal relating to said system parameter using said Hall effect signal and a reference signal for said system parameter,
      obtaining a calculated signal for said system parameter using said error signal, and
      utilizing said calculated signal as a new reference signal for said system parameter for a next iteration of said obtaining steps wherein said feedback system obtains the calculated signal by processing said error signal with a proportional integral controller.

6. The apparatus according to claim 5, wherein said feedback system obtains a calculated signal by integrating the output of said proportional integral controller in time to obtain said calculated signal as an angle, wherein said error signal is an angular speed, and said system parameter is an angle parameter.

7. A control apparatus, said apparatus comprising:
   a signal input unit for accessing a positional signal; and
   a feedback system for controlling a system parameter, said feedback system controlling said system parameter by:
      obtaining an error signal relating to said system parameter using said positional signal and a reference signal for said system parameter,
      obtaining a calculated signal for said system parameter using said error signal, and
      utilizing said calculated signal as a new reference signal for said system parameter, for a next iteration of said obtaining steps;
   wherein said feedback systems:
      obtains the error signal by cross-multiplying said positional signal with parameters based on said reference signal,
      obtains the calculated signal by processing said error signal with a proportional integral controller and integrating the output of said proportional integral controller in time to obtain said calculated signal as an angle, wherein said system parameter is an angle parameter, and
      performs a closed loop control that automatically corrects an error in said new reference signal, when said positional signal is corrupted due to noise or interferences.

* * * * *